United States Patent
Wang et al.

(10) Patent No.: US 12,088,500 B2
(45) Date of Patent: Sep. 10, 2024

(54) METHOD TO MITIGATE HASH CORRELATION IN MULTI-PATH NETWORKS

(71) Applicant: Google LLC, Mountain View, CA (US)

(72) Inventors: Rui Wang, Sunnyvale, CA (US);
Keqiang He, Fremont, CA (US);
Hassan Wassel, San Jose, CA (US);
Junlan Zhou, Sunnyvale, CA (US);
Shidong Zhang, San Jose, CA (US);
Leonid Poutievski, Santa Clara, CA (US); Shaileshh Bojja Venkatakrishnan, Columbus, OH (US)

(73) Assignee: Google LLC, Mountain View, CA (US)

( * ) Notice: Subject to any disclaimer, the term of this patent is extended or adjusted under 35 U.S.C. 154(b) by 190 days.

(21) Appl. No.: 17/569,096

(22) Filed: Jan. 5, 2022

(65) Prior Publication Data

US 2022/0131800 A1    Apr. 28, 2022

Related U.S. Application Data

(63) Continuation of application No. 16/857,862, filed on Apr. 24, 2020, now Pat. No. 11,223,561.

(51) Int. Cl.
*H04L 45/7453*     (2022.01)
*H04L 45/00*       (2022.01)
(Continued)

(52) U.S. Cl.
CPC ........ *H04L 45/7453* (2013.01); *H04L 45/125* (2013.01); *H04L 45/24* (2013.01); *H04L 45/54* (2013.01); *H04L 45/70* (2013.01)

(58) Field of Classification Search
None
See application file for complete search history.

(56) References Cited

U.S. PATENT DOCUMENTS

| 7,206,861 B1 | 4/2007 | Callon |
| 8,014,278 B1 | 9/2011 | Subramanian et al. |

(Continued)

FOREIGN PATENT DOCUMENTS

| CN | 104137494 A | 11/2014 |
| CN | 105049359 A | 11/2015 |

(Continued)

OTHER PUBLICATIONS

Al-Fares, Mohammad et al. "Hedera: Dynamic Flow Scheduling for Data Center Networks." Apr. 2010. NSDI '10: Proceedings of the 7th USENIX conference on Networked systems design and implementation. 15 pages.

(Continued)

*Primary Examiner* — Phirin Sam
(74) *Attorney, Agent, or Firm* — Lerner David LLP

(57) ABSTRACT

Methods are provided for mitigating hash correlation. In this regard, a hash correlation may be found between a first switch and a second switch in a network. In this network, a first egress port is to be selected among a first group of egress ports at the first switch for forwarding packets, and a second egress port is to be selected among a second group of egress ports at the second switch for forwarding packets, where the first group has a first group size and the second group has a second group size. Upon finding the hash correlation, a new second group size coprime to the first group size may be selected, and the second group of egress ports may be mapped to a mapped group having the new second group size. The second switch may be configured to route packets according to the mapped group.

20 Claims, 9 Drawing Sheets

(51) Int. Cl.
  *H04L 45/125* (2022.01)
  *H04L 45/24* (2022.01)

(56) References Cited

U.S. PATENT DOCUMENTS

| | | | |
|---|---|---|---|
| 8,244,909 | B1 | 8/2012 | Hanson et al. |
| 8,705,551 | B2 | 4/2014 | Addanki |
| 2008/0069114 | A1 | 3/2008 | Shimada |
| 2011/0013638 | A1 | 1/2011 | Matthews et al. |
| 2011/0013639 | A1* | 1/2011 | Matthews ............... H04L 45/22 370/395.32 |
| 2014/0195695 | A1 | 7/2014 | Okita |
| 2015/0078375 | A1 | 3/2015 | Hendel |
| 2017/0154042 | A1 | 6/2017 | Meyer |
| 2018/0048553 | A1 | 2/2018 | Hyoudou et al. |
| 2021/0006490 | A1* | 1/2021 | Michael ............... H04L 45/123 |
| 2021/0028994 | A1* | 1/2021 | Sattiraju ............... H04L 41/147 |
| 2021/0119930 | A1* | 4/2021 | Debbage ............... H04L 1/1642 |
| 2021/0306254 | A1* | 9/2021 | Marrotte ............... H04L 45/42 |
| 2022/0368625 | A1* | 11/2022 | Smith ............... H04L 63/105 |

FOREIGN PATENT DOCUMENTS

| | | |
|---|---|---|
| CN | 107094114 A | 8/2017 |
| EP | 2276207 A1 | 1/2011 |
| EP | 3057270 A1 | 8/2016 |

OTHER PUBLICATIONS

Alizadeh, Mohammad et al. "CONGA: Distributed Congestion-Aware Load Balancing for Datacenters." 2014. ACM SIGCOMM Computer Communication Review. vol. 44. pp. 503-514.

Carter, J. L. and Mark N. Wegman. "Universal Classes of Hash Functions." 1979. Journal of Computer and System Sciences 18, pp. 143-154.

Cisco. "Data Center Access Design with Cisco Nexus 5000 Series Switches and 2000 Series Fabric Extenders and Virtual PortChannels." Oct. 2012. pp. 1-120. Retrieved from the Internet: <https://itnetworkingpros.files.wordpress.com/2014/04/c07-572829-01_design_n5k_n2k_vpc_dg.pdf>.

Colbert, Bernard et al. "Heraclitus: A LFSR-based Stream Cipher with Key Dependent Structure." Feb. 2011. 2011 International Conference on Communications and Signal Processing. DOI: 10.1109/ICCSP.2011.5739287. 27 pages.

Dell, Inc. "Dell Configuration Guide for the S4048-ON System 9.9(0.0)." 2015. pp. 1-1192. Retrieved from the Internet: <https://www.dell.com/support/manuals/us/en/19/force10-s4048-on/s4048_on_9.9.0.0_config_pub-v1/rtag7?guid=guid-9bda04b4-e966-43c7-a8cf-f01e7ce600f4&lang=en-us>.

Everitt, B. S. and A. Skrondal. "The Cambridge Dictionary of Statistics." Fourth Edition. © 2010. Cambridge University Press. New York, New York. 480 pages.

Extended European Search Report for European Patent Application No. 20211500.2 dated Apr. 29, 2021. 12 pages.

He, Keqiang et al. "Presto: Edge-based Load Balancing for Fast Datacenter Networks." Aug. 2015. ACM SIGCOMM Computer Communication Review. 14 pages.

Hopps, C. "Analysis of an Equal-Cost Multi-Path Algorithm." Nov. 2000. RFC 2992, RFC Editor. 8 pages.

Jain, Sushant et al. "B4: Experience with a Globally-Deployed Software Defined WAN." Aug. 2013. Proceedings of the ACM SIGCOMM Conference. Hong Kong, China. 12 pages.

Joglekar, Abhijeet et al. "A Scalable and High Performance Software iSCSI Implementation." Jan. 2005. FAST '05: 4th USENIX Conference on File and Storage Technologies. pp. 267-280.

McKeown, Nick. "Software-defined Networking." Apr. 2009. Infocom. 64 pages. Retrieved from the Internet: <https://www.cs.odu.edu/~cs752/papers/sdr-infocom_brazil_2009_v1-1.pdf>.

Näslund, Mats. "Universal Hash Functions & Hard Core Bits." 1995. Advances in Cryptology—EUROCRYPT '95. EUROCRYPT 1995. Lecture Notes in Computer Science, vol. 921. Springer, Berlin, Heidelberg. pp. 356-366.

Netgear. "What is a virtual LAN (VLAN) and how does it work with my managed switch?" Nov. 28, 2016. 4 pages. Retrieved from the Internet: <https://kb.netgear.com/21574/What-is-a-virtual-LAN-VLAN-and-how-does-it-work-with-my-managed-switch>.

Prabhu, Anvitha et al. "CEF Polarization." Cisco. Jul. 26, 2013. 5 pages. Retrieved from the Internet: <https://www.cisco.com/c/en/us/support/docs/ip/express-forwarding-cef/116376-technote-cef-00.html>.

Spring, Neil et al. "Measuring ISP Topologies with Rocketfuel." 2002. ACM SIGCOMM Computer Communication Review, vol. 32, pp. 133-145.

Stavinov, Evgeni. "A Practical Parallel CRC Generation Method." Jan. 2010. Circuit Cellar—The Magazine For Computer Applications. vol. 31, Issue 234. pp. 38-45.

Sun, Yan and Min Sik Kim. "High Performance Table-Based Algorithm for Pipelined CRC Calculation." May 2010. Proceedings of IEEE International Conference on Communications, ICC 2010, Cape Town, South Africa. 8 pages.

Vanini, Erico et al. "Let It Flow: Resilient Asymmetric Load Balancing with Flowlet Switching." Mar. 2017. Proceedings of the 14th USENIX Symposium on Networked Systems Design and Implementation (NSDI '17). pp. 407-420.

Wu, Xin et al. "NetPilot: Automating Datacenter Network Failure Mitigation." Aug. 2012. ACM SIGCOMM Computer Communication Review. vol. 42, Issue 4. pp. 419-430.

Yen, Jin Y. "An Algorithm for Finding Shortest Routes From All Source Nodes to a Given Destination in General Networks." Jan. 1970. Quarterly of Applied Mathematics. vol. 27, No. 4, pp. 526-530.

Zhang-Shen, Rui. "Designing a Predictable Internet Backbone with Valiant Load-Balancing." Jun. 2005. IWQoS '05: Proceedings of the 13th international conference on Quality of Service. pp. 178-192.

Zhou, Junlan and Zhengrong Ji. "Hashing technique to optimally balance load within switching networks." Oct. 5, 2017. Technical Disclosure Commons. 7 pages.

Zhou, Junlan et al. "WCMP: Weighted Cost Multipathing for Improved Fairness in Data Centers." Apr. 2014. Proceedings of the Ninth European Conference on Computer Systems, ACM, pp. 1-13.

Office Action for Chinese Patent Application No. 202011064670.1 dated Dec. 20, 2023. 6 pages.

Li. Research and design of network processor packet conversion engine PTE. Dec. 16, 2003. China's Excellent Master's Thesis Database. 73 pages. [English Abstract Only].

Cao et al., "Catching the Flow with Locality Sensitive Hashing in Programmable Data Planes," 2018 IEEE 9th International Conference on Software Engineering and Service Science (ICSESS). 5 pages.

* cited by examiner

Determine that a hash correlation exists between a first switch in a network and a second switch in the network, wherein a first egress port is to be selected among a first group of egress ports at the first switch for forwarding packets, a second egress port is to be selected among a second group of egress ports at the second switch for forwarding packets, and the first group having a first group size and the second group having a second group size — 910

Select, upon determining that the hash correlation exists, a new second group size coprime to the first group size — 920

Map the second group of egress ports to a mapped group having the new second group size — 930

Configure the second switch to route packets according to the mapped group — 940

METHOD TO MITIGATE HASH CORRELATION IN MULTI-PATH NETWORKS

CROSS-REFERENCE TO RELATED APPLICATIONS

The present application is a continuation of U.S. patent application Ser. No. 16/857,862, filed on Apr. 24, 2020, the disclosure of which is incorporated herein by reference.

BACKGROUND

Load balancing is critical in network operations and management. For example, with Equal-Cost Multi-Path (ECMP) routing, packet forwarding to a single destination may occur over multiple least-cost paths based on a hash of the packet's header fields, which allows bandwidth on multiple paths to be used. In such a system, packets may be forwarded in multiple flows, and load balancing may be achieved by hashing one or more header fields so that packets within each flow follows the same path to avoid packet reordering. Likewise, Weighted-Cost Multi-Path (WCMP) routing also allows forwarding of packets over multiple paths to a single destination, except that the multiple paths may be assigned different weights, making some paths more likely to be selected than other paths.

A challenging problem for hash-based load balancing is that reuse of identical or correlated hash functions in different routers may cause load imbalance. For example, when different switches repeatedly use the same hash algorithm, a single link may be selected for all traffic destined for one destination prefix, while other links were underused or unused. One way to avoid hash correlation is to use a different hash function for each switch in a network. However, switch chips support a limited number of hash functions. Further, computation using a large number of hash functions is impractical because it may create a bottleneck at high packet rates. Another way to mitigate hash correlation is to manipulate several hash functions based on each specific switch to obtain more variations. However, such manipulation may not work for odd number of equal-cost paths due to the rolling property of cyclic redundancy check (CRC), or when randomization is reserved for other network management. Providing different seeds to switch chip hash functions may mitigate, but also does not resolve the hash correlation problem. Still another way to mitigate hash correlation is to select hash functions based on the value of Time-To-Live (TTL) in the packet header. However, this method requires altering the packet processing pipeline in the data plane, and thus may require hardware changes and vendor cooperation.

BRIEF SUMMARY

The present disclosure provides for determining, by one or more processors, that a hash correlation exists between a first switch in a network and a second switch in the network, wherein a first egress port is to be selected among a first group of egress ports at the first switch for forwarding packets, a second egress port is to be selected among a second group of egress ports at the second switch for forwarding packets, and the first group having a first group size and the second group having a second group size; selecting, by the one or more processors upon determining that the hash correlation exists, a new second group size coprime to the first group size; mapping, by the one or more processors, the second group of egress ports to a mapped group having the new second group size; and configuring, by the one or more processors, the second switch to route packets according to the mapped group.

Determining that the hash correlation exists may be based on determining that a first hash function being applied at the first switch is the same as a second hash function being applied at the second group, and that the second group is reachable by the first group.

The second group may be an ECMP group, and the new second group size may be selected further based on a covariance of the ECMP group meeting a predetermined threshold.

The second group may be a WCMP group, and the new second group size may be selected further based on a K-S statistic of the WCMP group meeting a predetermined threshold.

The new second group size may be selected further based on meeting a memory capacity for routing tables in the network.

The method may further comprise determining, by the one or more processors, that a first memory usage for the first group by the first switch is greater than a second memory usage for the second group by the second switch, wherein selecting the new second group size is based on the first memory usage being greater than the second memory usage.

The method may further comprise determining, by the one or more processors, that a first memory usage for the first group by the first switch is less than a second memory usage for the second group by the second switch, wherein, instead of selecting the new second group size and mapping to the mapped group, a new first group size is selected for mapping the first group.

The second group may be a WCMP group, and mapping of the second group of egress ports to the mapped group having the new second group size may be further based on routing weights assigned to the second group of egress ports. The method may further comprise receiving, by the one or more processors, telemetry data of the network; updating, by the one or more processors, routing weights to the second group of egress ports based on the received telemetry data; re-mapping, by the one or more processors, the second group of egress ports based on the updated routing weights.

The present disclosure further provides for a system comprising one or more processors. The one or more processors are configured to: determine that a hash correlation exists between a first switch in a network and a second switch in a network, wherein a first egress port is to be selected among a first group of egress ports at the first switch for forwarding packets, a second egress port is to be selected among a second group of egress ports at the second switch for forwarding packets, and the first group having a first group size and the second group having a second group size; select, upon determining that the hash correlation exists, a new second group size coprime to the first group size; map the second group of egress ports to a mapped group having the new second group size; and configure the second switch to route packets according to the mapped group.

Determining that the hash correlation exists may be based on determining that a first hash function being applied at the first switch is the same as a second hash function being applied at the second group, and that the second group is reachable by the first group.

The second group may be an ECMP group, and the new second group size may be selected further based on a covariance of the ECMP group meeting a predetermined threshold.

The second group may be a WCMP group, and the new second group size may be selected further based on a K-S statistic of the WCMP group meeting a predetermined threshold.

The new second group size may be selected further based on meeting a memory capacity for routing tables in the network.

The one or more processors may be further configured to determine that a first memory usage for the first group by the first switch is greater than a second memory usage for the second group by the second switch, wherein selecting the new second group size is based on the first memory usage being greater than the second memory usage.

The one or more processors may be further configured to determine that a first memory usage for the first group by the first switch is less than a second memory usage for the second group by the second switch, wherein, instead of selecting the new second group size and mapping to the mapped group, a new first group size is selected for mapping the first group to a first mapped group.

The second group may be a WCMP group, and mapping of the second group of egress ports to the mapped group having the new second group size may be further based on routing weights assigned to the second group of egress ports. The one or more processors may be further configured to: receive telemetry data of the network; update routing weights to the second group of egress ports based on the received telemetry data; re-map the second group of egress ports based on the updated routing weights.

The present disclosure still further provides for non-transitory computer-readable storage medium storing instructions executable by one or more processors for performing a method. The method comprises: determining that a hash correlation exists between a first switch in a network and a second switch in the network, wherein a first egress port is to be selected among a first group of egress ports at the first switch for forwarding packets, a second egress port is to be selected among a second group of egress ports at the second switch for forwarding packets, and the first group having a first group size and the second group having a second group size; selecting, upon determining that the hash correlation exists, a new second group size coprime to the first group size; mapping the second group of egress ports to a mapped group having the new second group size; and configuring the second switch to route packets according to the mapped group.

Determining that the hash correlation exists may be based on determining that a first hash function being applied at the first switch is the same as a second hash function being applied at the second group, and that the second group is reachable by the first group

BRIEF DESCRIPTION OF THE DRAWINGS

FIG. 9 is a flow diagram of an example method in accordance with aspects of the disclosure.

DETAILED DESCRIPTION

The technology generally relates to mitigation of hash correlation in multipath networks. For instance, to route packets through a multipath network, a first egress port may be selected among a first group of egress ports at the first switch, and a second egress port may be selected among a second group of egress ports at the second switch, where the first group has a first group size and the second group has a second group size. Each such selection may be performed by applying a hash function followed by a modulus function based on the respective group size. In this regard, existence of a hash correlation at two switches may result in the same path being selected through the two switches, leaving other paths between the two switches unused.

To address the problems described above, a network controller may be configured to determine whether a hash correlation exists between switches in the network. For instance, a hash correlation may exist if a first hash function applied at the first switch and a second hash function applied at a second switch are the same, and if the second group is reachable by the first group. Upon finding the hash correlation, the network controller may select a new group size for the first group and/or the second group, and remap the groups accordingly. For example, the network controller may select a new second group size that is coprime to the first group size, and map the second group of egress ports to a mapped group having the new second group size. The network controller may then configure the second switch to route packets according to the mapped group.

The technology is advantageous in a number of ways. For instance, by avoiding adding new hash functions to the switches, the system may mitigate hash correlation without requiring switch vendors to support new hash functions or creating computation bottlenecks. By avoiding manipulation of the existing hash functions, computations of CRCs are not needed, and randomization may be reserved for other network functions. Further, the technology can be adapted to mitigate hash correlation in both ECMP and WCMP networks, such as features that dynamically adapt the mapping of WCMP egress ports according to routing weight changes. Features of the technology also provide for reducing overall memory usage by the switches in the network and at the same time, increasing uniformity of traffic by using diversified error bounds for coprime group size selection at different switches.

Figure 1A:
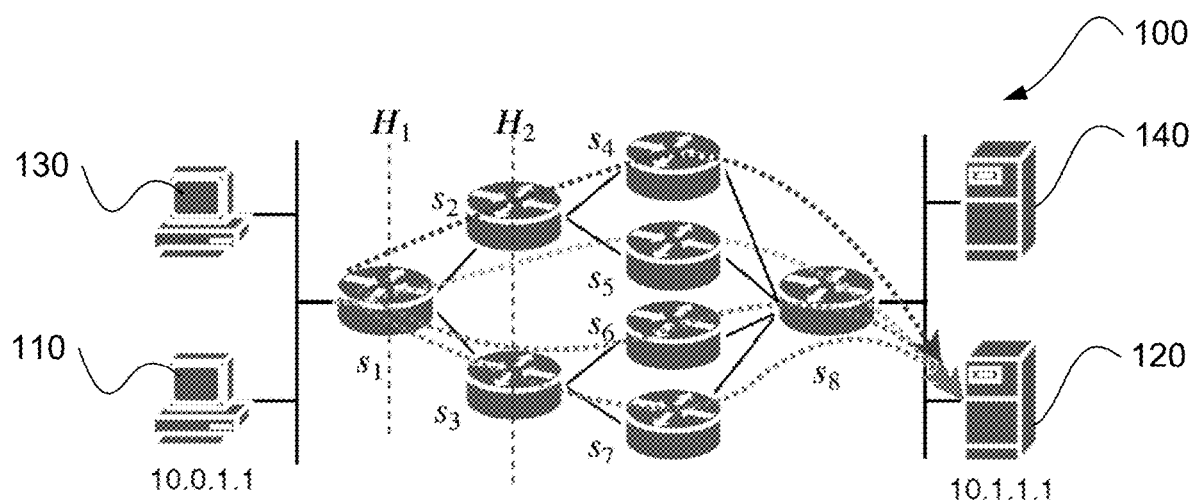
FIGS. 1A and 1B illustrate routing through an example multipath network in accordance with aspects of the disclosure.
Figure 1B:
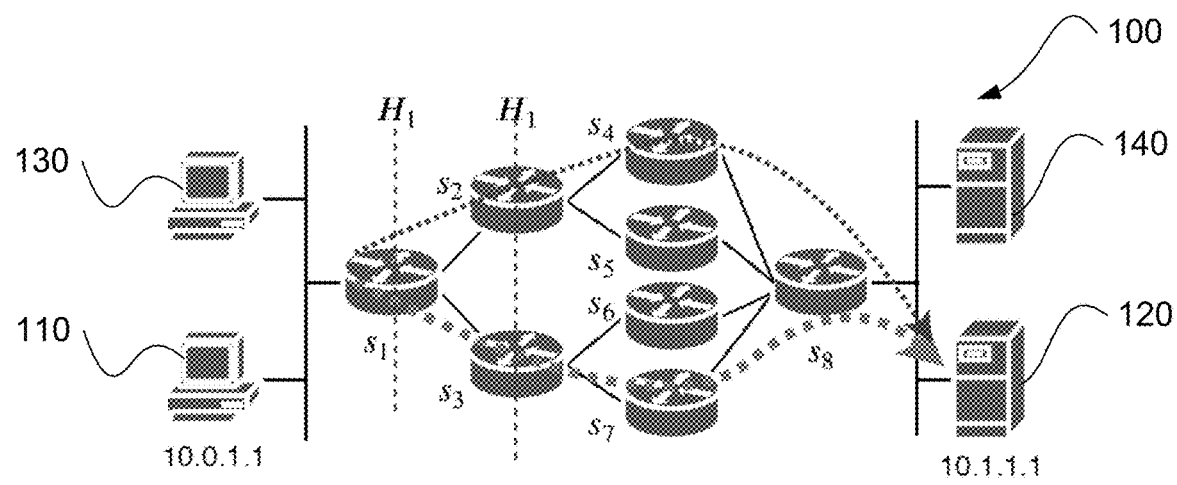
Figure 1B:
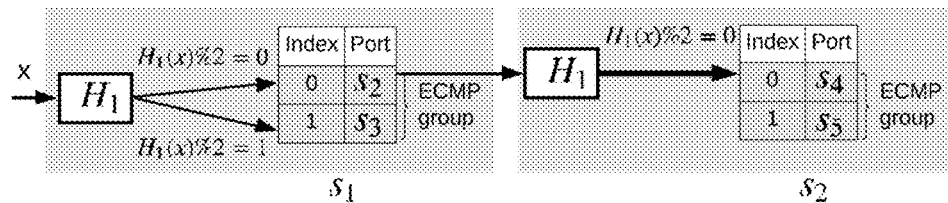

FIGS. 1A and 1B are block diagrams of a multipath network 100 in which hash-based load balancing may be used. The network 100 may include a plurality of computing devices, such as computing devices 110, 120, 130, 140 shown. The plurality of computing devices may be distributed geographically and/or organized in clusters. For example, computing devices 110 and 130 may be in one location or cluster, and computing devices 120 and 140 may be in another location or cluster. To route a packet from a computing device of one location or cluster to a computing device in another location or cluster, one or more switches may be provided in the network 100, such as switches S1, S2, S3, S4, S5, S6, S7, and S8 shown. In some instances, the switches in a multipath network may be arranged in a hierarchy such that routing from a source to a destination requires routing through a switch on each layers of the hierarchy before reaching the destination. The example network 100 has a hierarchy with three layers of switches, a first layer including switch S1, a second layer including switches S2, S3, and a third layer including switches S4, S5, S6, S7. Although only a few computing devices and a few switches are shown, in practical examples the system may include any of a number of computing devices and any of a number of switches.

Packets may be routed from a source computing device to a destination device through multiple possible paths. In the example shown in FIG. 1A, a packet may be forwarded from source computing device 110 to destination computing device 120 through four possible paths as indicated by the dotted arrows. To determine which of the multiple paths to use for forwarding a packet, one or more hash functions may be applied to one or more header fields of the packet. For instance, a hash function may be applied at each layer where selection of an egress port among multiple possibilities is needed. In the example shown, a first hash function H1 may be applied at switch S1 to select between switches S2 and S3 for the next hop, a second hash function H2 may be applied at switch S2 to select between switches S4 and S5 for the next hop, and also at switch S3 to select between switches S6 and S7 for the next hop.

The set of available egress ports for selection as the next hop may be referred to as a group. Thus in multipath routing, multiple groups may be available at one or more hops between a source and a destination. For example, egress ports of switch S1 to switches S2 and S3 are in a group with size n=2, egress ports of switch S2 to switches S4 and S5 are in a group with n=2, and egress ports of switch S3 to switches S6 and S7 are also in a group with n=2. For ECMP routing, each egress port in an ECMP group may be assigned an equal weight such that there is an equal chance any of the egress ports may be selected for routing a flow of packets. For WCMP routing, different weights may be assigned to the egress ports in a WCMP group such that some of the egress ports are more likely to be selected than other egress ports for routing a flow of packets.

Further in this regard, the next hop may be mapped by applying a hash function, and then apply a modulus operation to the result of the hash function. As an example, an egress port of a switch may be selected for the next hop based on applying a hash function to fields of a packet header, such as 5 tuples including source prefix (e.g., IP address), source port, destination prefix (e.g., IP address), destination port, and protocol, with a resulting value of h. A modulus operation may then be applied to the resulting value h, for example by the group size n at the switch, which may be expressed as h % n. Thus, egress port for forwarding a packet at switch S1 may be selected by applying H1 to the packet's header fields, and then modulo the hash result by 2. Likewise, egress port for forwarding a packet at switch S2 may be selected by applying H2 to the packet's header fields, and then modulo the hash result by 2.

As illustrated by FIG. 1A, when the hash functions used for hopping from different layers are not the same or correlated, each egress port at each layer has some chance of being selected as the next hop for a packet, thereby providing load balancing. In contrast, FIG. 1B illustrates load imbalance caused by using the same or correlated hash functions. As shown, the same hash function H1 is applied both at switch S1 as well as at switches S2 and S3. For example, at switch S1, applying H1 and then %2 to a packet with a particular set of header fields x may result in a value 0, based on which the egress port to switch S2 may be selected. Then when the packet arrives at switch S2, H1 followed by %2 is again applied to the header fields x, which again result in the value of 0, based on which the egress port to switch S4 is selected. Thus, while both egress ports to switches S4 and S5 are available as the next hop from switch S2, the path through switch S4 is always selected, leaving the alternative path through switch S5 unused and thus causing load imbalance between switches S4 and S5. Likewise, the same hash correlation at switch S3 may cause switch S7 to be always selected over switch S6, causing load imbalance between switches S6 and S7. Although the same hash function H1 is used as illustration in this example, in other examples the hash function at each hop may be correlated instead of being identical.

Figure 2:
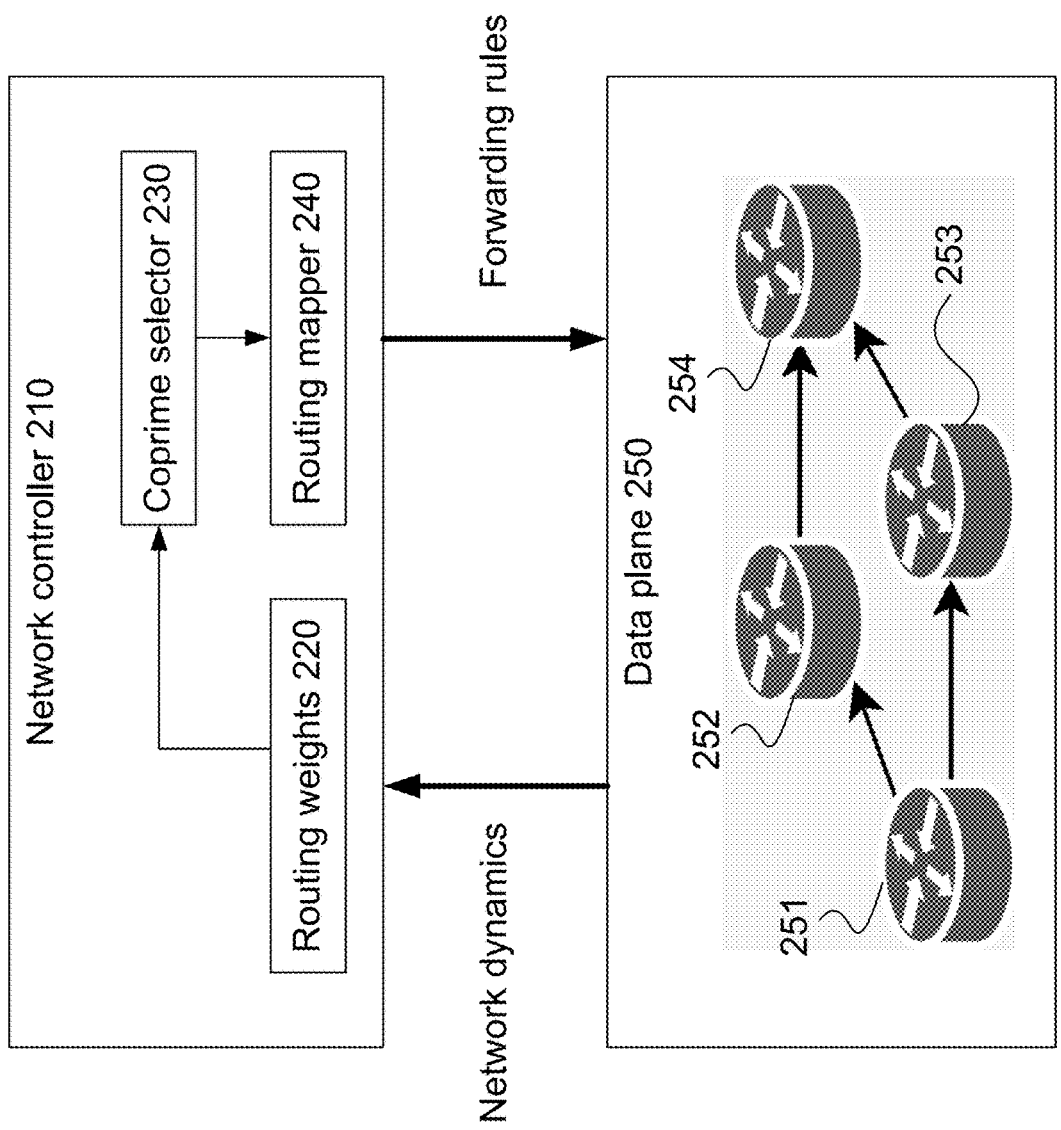
FIG. 2 shows an example system configured to mitigate hash correlation in accordance with aspects of the disclosure.

To mitigate hash correlation in a network, the hash function and/or the modulus operation must be changed at each level for selection of a next hop. FIG. 2 is a block diagram showing an example system 200 configured to address the problems illustrated by FIG. 1B. The system 200 includes a network controller 210 and a data plane 250 including a plurality of switches for routing packets between computing devices in a network. Although only a few switches 251, 252, 253, 254 are shown, in practical examples the system may include any of a number of computing devices and any of a number of switches.

As mentioned above, to mitigate hash correlation, the hash function and/or the modulus operation may need to be changed at one or more layers where a selection is to be made of an egress port among multiple possibilities. Further as described above, generating new hash functions may require hardware changes and/or increase computation time. Thus, the system 200 is configured to mitigate hash correlation by ensuring that the modulus operation de-correlates the hash functions for each hop. In order to do so, the network controller 210 may include a coprime selector 230 that computes one or more new group sizes for the modulus operations, which are described with reference to FIGS. 3, 4, 5A-B, and 6. As described with reference to FIGS. 3, 7A-B, the network controller 210 may also include a routing mapper 240 configured to, for any group that has a new group size, map the egress ports in that group to a mapped group according to the new group size. Further as described with reference to FIGS. 3, 7A-B, the network controller 210 may further generate forwarding rules according to the mapped egress ports as well as any groups that have not been changed, and in the case of WCMP, also according to the routing weights 220. The network controller 210 may then configure the switches in the data plane 250 to route packets according to the forwarding rules.

Further as shown, the network controller 210 may monitor and control routing of the switches in the data plane 250. For instance, the network controller 210 may assign routing weights 220 to the different routes provided by the switches in the data plane 250. For an ECMP network, equal weights are assigned to all routes between a source and destination. For a WCMP network, different routing weights 220 may be assigned to the routes between a source and a destination, which may be based on network dynamics such as telemetry data. For example, the telemetry data may be received by the network controller 210 from the switches in the network. As such, the network controller 210 may update the routing weights based on updates in telemetry data, and re-map the egress ports based on the updated routing weights.

The network controller 210 may be hardware based or may be software defined such as a Software Defined Network (SDN) controller. For instance, the network controller 210 may be a software running on one or more computing devices containing one or more processors, memory, and other components typically present in general purpose computing devices. The one or more processors can be dedicated components such as an application specific integrated circuit ("ASIC"), which may be customized or off-the-shelf, or any other conventional processors, such as commercially available microprocessors, CPUs, etc. Although not necessary, one or more of the processors may include specialized hardware components to perform specific computing processes.

Memory of the computing devices can be of any non-transitory type capable of storing information accessible by the processor, such as a hard-drive, memory card, ROM, RAM, DVD, CD-ROM, write-capable, and read-only memories. Memory of the computing devices can store information accessible by the processors, including data and instructions. For instance, memory of the computing devices can store instructions that can be executed by the processors. The memory of the computing devices can also include data that can be retrieved, manipulated, and/or stored by the processors.

The instructions can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance.

The data can have any of a number of structures. For example, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

Although not shown, the computing devices may optionally include other components typically present in general purpose computer devices. For example, the computing devices may include output devices, such as displays, speakers, haptics, etc. The computing devices may also include user input devices, such as a mouse, keyboard, touch-screen, microphones, sensors, etc.

Each of the switches 251, 252, 253, 254 may contain one or more processors, memories, and other components typically present in general purpose computing devices as described above. The computing devices running the network controller 210 and switches 251, 252, 253, 254 can be at different nodes of a network, such as the network shown in FIG. 1A, and capable of directly and indirectly communicating with other nodes of the network. The network and intervening nodes described herein can be interconnected using various protocols and systems, such that the network can be part of the Internet, World Wide Web, specific intranets, wide area networks, or local networks. The network can utilize standard communication protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Although not shown, the system may further include one or more storage systems, which can be of any type of computerized storage capable of storing information accessible by one or more of the computing devices running the network controller 210 and/or switches 251, 252, 253, 254, such as a hard-drive, memory card, ROM, RAM, DVD, CD-ROM, write-capable, and read-only memories. In addition, the storage system may include a distributed storage system where data is stored on a plurality of different storage devices which may be physically located at the same or different geographic locations. The storage system may be connected to various computing devices via a network, and/or may be directly connected to any of computing devices running the network controller 210 and/or 251, 252, 253, 254.

The computing devices running the network controller 210 and/or the switches 251, 252, 253, 254, and their respective processors, memories, and other elements may each comprise multiple processors, computers, computing devices, or memories that may or may not be stored within the same physical housing. For example, the memory of the computing devices can be a hard drive or other storage media located in housings different from that of the computing devices. Accordingly, references to a processor, computer, computing device, or memory will be understood to include references to a collection of processors, computers, computing devices, or memories that may or may not operate in parallel. For example, the computing devices may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

Figure 3:
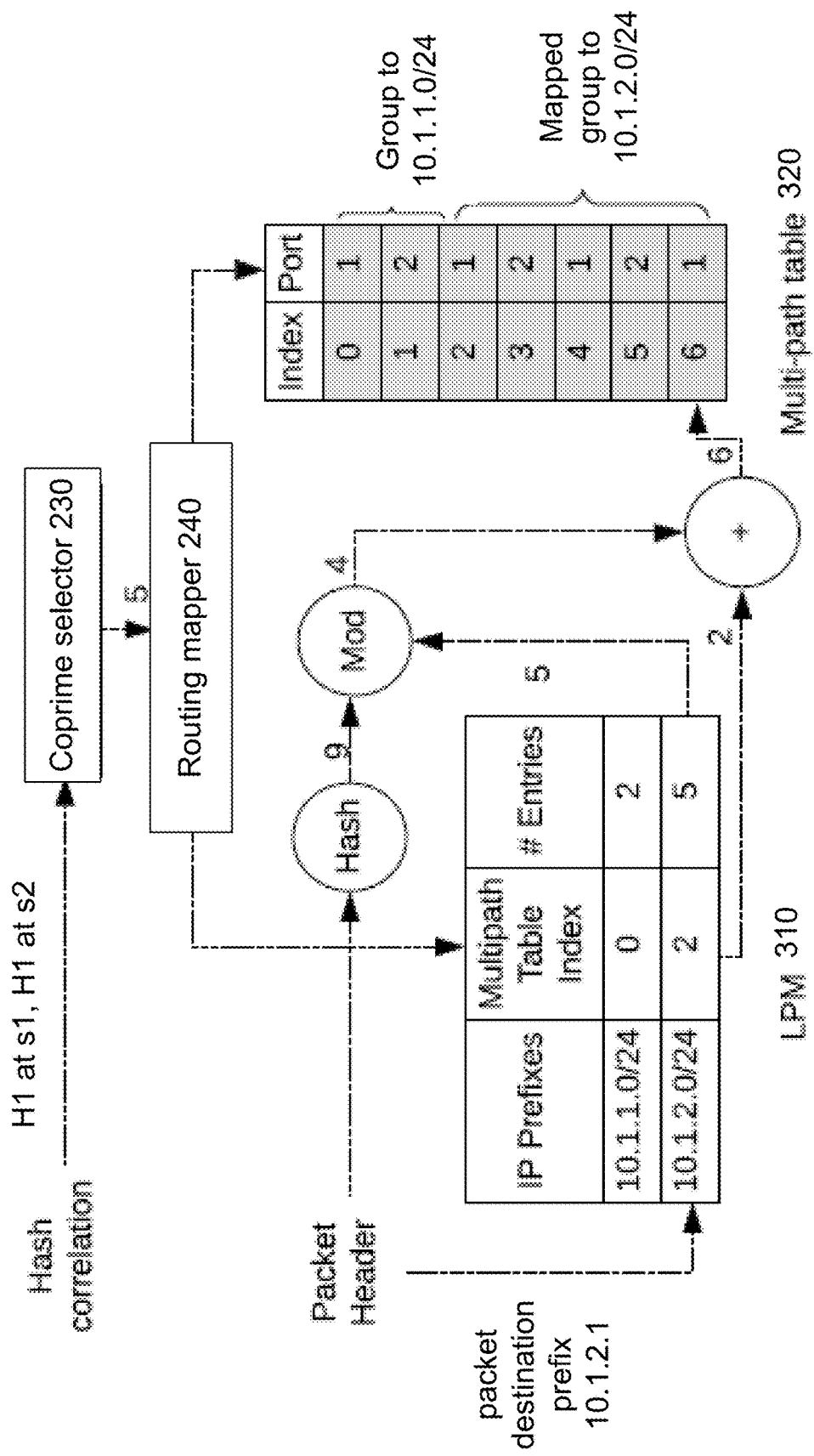
FIG. 3 is a pictorial diagram illustrating an example process for mitigating hash correlation in accordance with aspects of the disclosure.

FIG. 3 is a pictorial diagram illustrating an example process to mitigate hash correlation in a multipath network, which may be performed by the network controller 210. FIG. 3 illustrates this process with reference to the example network 100 of FIG. 1B. For instance, since H1%2 is applied at switch S1 and also applied at switch S2 network controller 210 may determine that there is a hash correlation between the two layers.

Figure 4:
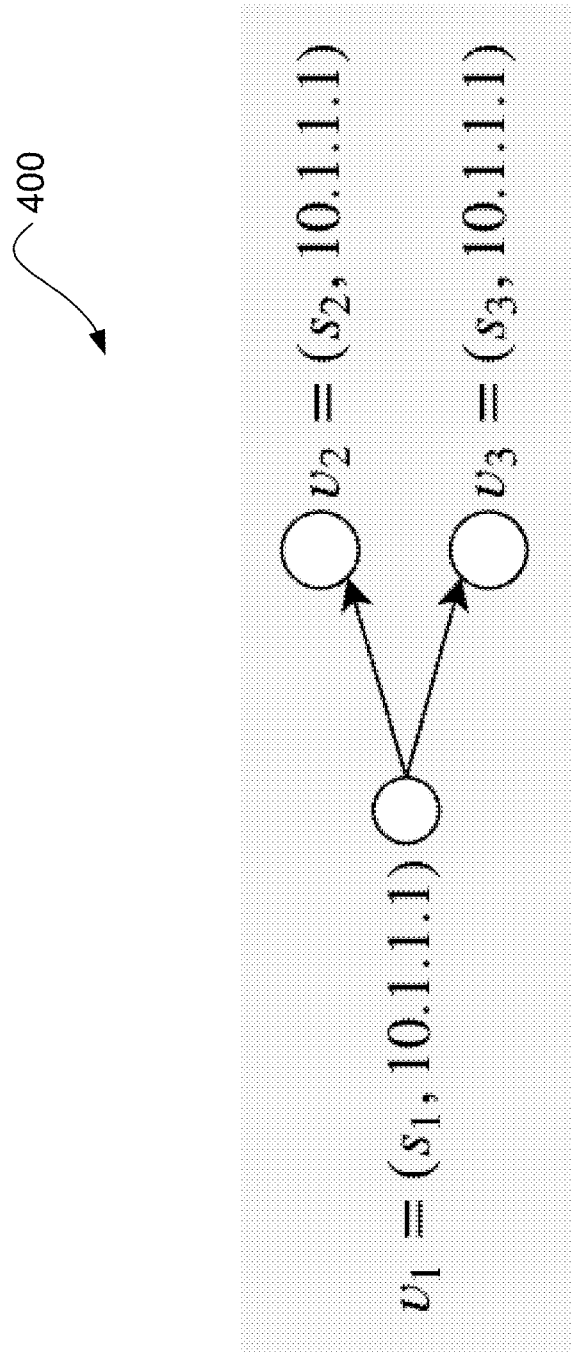
FIG. 4 illustrates an example graph for determining hash correlation in accordance with aspects of the disclosure.

Further in this regard, the network controller 210 may be configured to find network-wide hash correlations, for example by building directed graphs. FIG. 4 shows an example directed graph 400. The graph represents a group v=(s, d), where s is the switch and d is the destination prefix. Thus the graph 400 represents a group v1=(s1, 10.1.1.1), where the edge (v1, v2) denotes that group v1 of switch S1 is the first pre-hop of group v2 of switch S2 along the routing path for a destination prefix 10.1.1.1. The network controller 210 may determine that an edge (vi, vj) is correlated if group vj is reachable from group vi, the hash functions of them are the same, and the sizes of the two groups are both even. Thus, since group v2 of switch S2 is reachable from group v1 of switch S1, and the hash function H1 applied at both switches is the same, groups v1 and v2 are correlated.

To mitigate the hash correlation, instead of changing the hash functions, the modulus operation may be changed by using a new group size for v1 and/or v2. Thus, instead of changing the H1 applied at switch S2, a new group size q may be computed so that H1% q is different from H1%2. In this regard, according to the coprime theorem, the network controller 210 may use the coprime selector 230 to compute the new group size q such that q is coprime to n. For example, since n=2, to be coprime to n, q can be any odd number greater than 1. In the example shown, integer 5 is chosen as the new group size q.

For instance, the coprime selector 230 may select an integer by reducing an error (v, q) to meet a threshold e, where error (v, q) represents the error of applying q to a group v. For an ECMP group, which has a uniform distribution, error (v, q) may be quantified by the coefficient of variance for the ECMP group. A larger coefficient of variance indicates higher non-uniformity and thus generally less desirable for ECMP load balancing. The coefficient of variance may be computed as the ratio of the standard deviation to the mean of set $U=\{u_i | i \in [1,L]\}$, where $u_i$ indicates the number of duplicates for the i-th egress port in an ECMP group, $u_i$ is either $\lceil q/L \rceil$ or $\lfloor q/L \rfloor+1$. In the example of FIG. 3, a coprime q=5 leads to U=[3,2], a standard deviation of 0.5, an average of 2.5, and a coefficient of variation of 0.2.

Figure 5A:
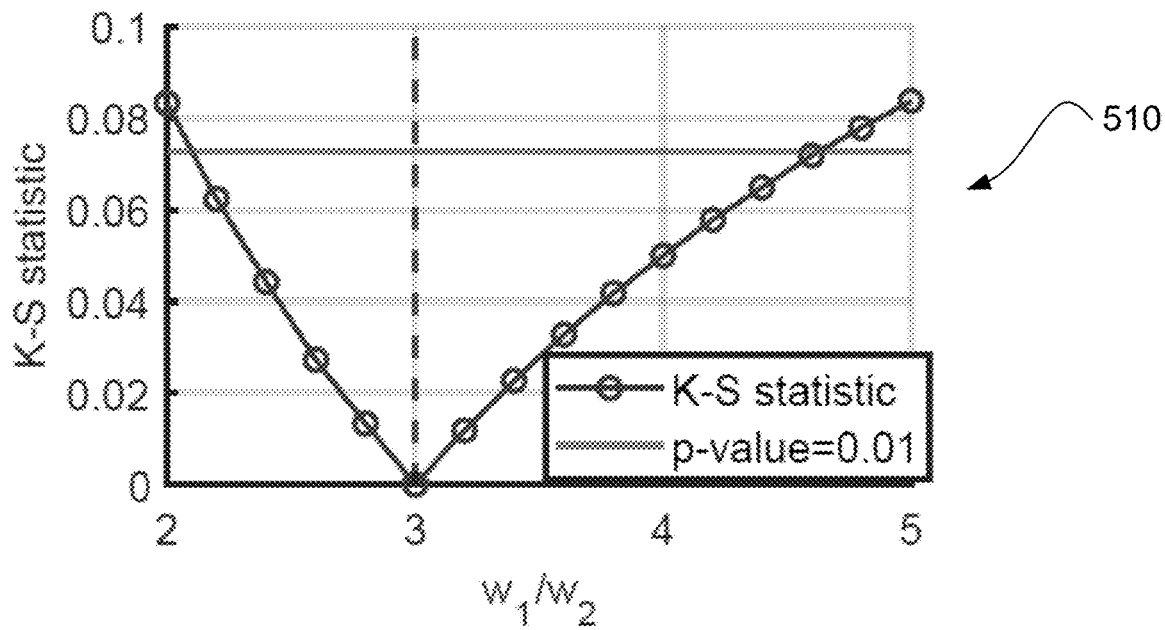
FIGS. 5A and 5B show example graphs of parameters used for coprime selection for a WCMP network in accordance with aspects of the disclosure.
Figure 5B:
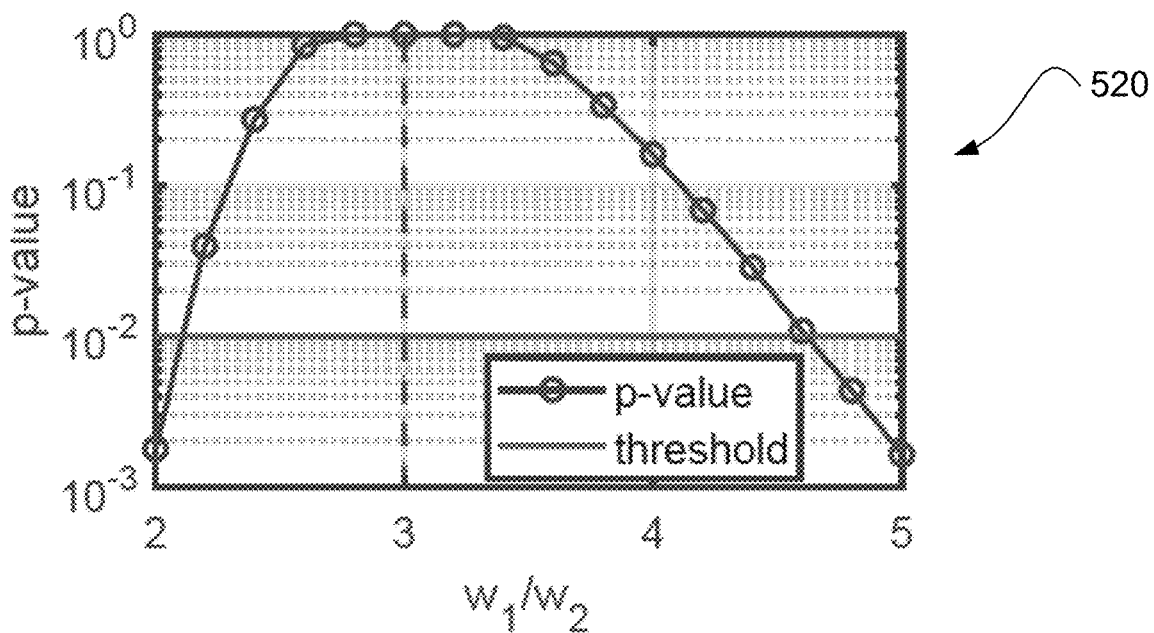

In contrast, for a WCMP group that does not have a uniform distribution, the error (v, q) may be quantified by K-S statistics instead of the coefficient of variance. As such, coprime selector 230 may select an integer by reducing the error (v, q) based on K-S statistics below a predetermined threshold T. FIGS. 5A and 5B show example graphs 510 and 520 of K-S statistics for a WCMP group with weight ratio of 3:1. The K-S statistics of graph 510 indicate the supremum distance between two Cumulative Distribution Functions (CDFs). The p-value of graph 520 indicates the probability of two CDFs being the same. Thus in this example, when the K-S statistic is below 0.07, the p-value meets the predetermined threshold T of 0.01.

Note that, the coprime selector 230 in this example selected a new group size q=5, which is one of many possibilities that is coprime to 2. In this regard, selection of the new group size may be further based on a number of factors in addition to being coprime to the size of another group. For instance, the smaller the coprime integer selected as the new group size, the greater the chance that the hash correlation may not be effectively mitigated. On the other hand, larger integers generate more entries that occupy more memory space, which may result in the routing table running out of space. Further, for a multipath network with multiple layers of switches, multiple coprime numbers may need to be selected as new group sizes to mitigate hash correlation between the different layers, which may exacerbate these problems. Thus, coprime selection may be based on balancing these factors.

Figure 6:
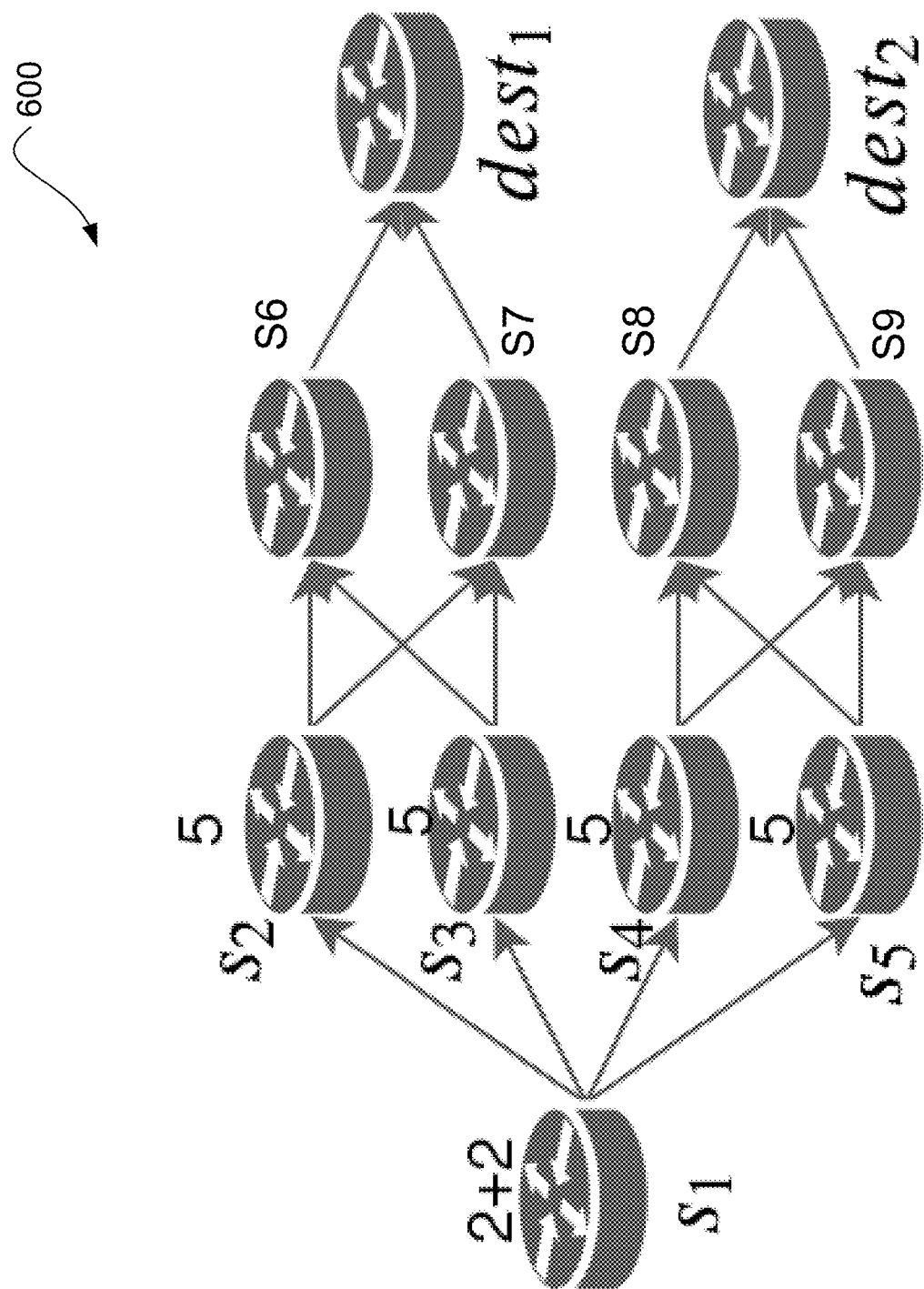
FIG. 6 illustrates an example coprime selection to reduce memory usage in accordance with aspects of the disclosure.

FIG. 6 is a block diagram illustrating an example coprime selection. The multipath network 600 is shown with three layers of switches, a first layer including switch S1, a second layer including switches S2, S3, S4, S5, and a third layer including switches S6, S7, S8, S9. Further as shown, switch S1 has a group of 4 egress ports, while switch S2, S3, S4, and S5 each has a group with 2 egress ports. To reduce overall memory usage in the network, new group sizes, if any, may be assigned in a descending order based on memory usages of the switches where the groups reside. For instance, the groups may be aggregated by its destination prefix and sorted according to M[S[v]], where v denotes the group, S[v] is the switch including v, and M[S[v]] is the memory usage of switch S[v]. The coprime selector 230 may assign L as the group size of the group having the greatest memory usage, and then find coprime sizes for the other groups. In other words, the group with the greatest memory usage does not change its group size. Thus in the example shown, if it is determined that switch S1 has a greater memory usage than the switches S2, S3, S4, S5, then the group of switch S1 will be assigned with group size L=4. A coprime group size may then be determined for each of switches S2, S3, S4, S5 in the next layer. For instance, a coprime number may be selected for each group based on reducing the error as described above with reference to FIG. 3. In the example shown, an integer 5 that is coprime to 4 is selected for each of the groups at switches S2, S3, S4, and S5.

Additionally or alternatively, the system may be further configured to minimize error for a given memory size. For example, the error threshold, e for ECMP or T for WCMP described above, may be assigned an initial, small value, and iteratively increased to determine group sizes until the memory usage of the network fits within the memory capacity C. Further, diverse errors may be used for determining coprime group sizes for different switches within the network. For instance, a bottleneck switch Sm may be identified, which may be the switch in the network using the maximum memory among all the switches. The error bound E[Sm] for the group on switch Sm may be given an initial, small value, and then incremented by a predefined rate σ_e until the memory usage of the network fits within the memory capacity C.

Returning to FIG. 3, to generate a new, mapped group, based on the new group size, the routing mapper 240 may then map entries representing the actual egress ports L of a group v into q buckets. For instance, the mapping may be performed by replicating one or more of the egress ports. By way of example, the first $\lfloor q \% L \rfloor$ entries of group v may be replicated $\lfloor q/L \rfloor+1$ times, and the remaining entries of group v may be replicated $\lfloor q/L \rfloor$ times. In the example shown, Longest Prefix Match (LPM) table 310 for switch s2 include entries for actual egress ports to 2 destinations, a first group of egress ports routing to destination IP prefix 10.1.1.0/24, and a second group of egress ports routing to IP prefix 10.1.2.0/24. The second group of 2 entries are mapped into 5 buckets by replicating the first $\lfloor 5\%2 \rfloor=1$ entry $\lfloor 5/2 \rfloor+1=3$ times, and by replicating the remaining 1 entry $\lfloor 5/2 \rfloor=2$ times. The resulting 5 entries are then assigned indices, for example by incrementing from the starting index of the group as shown in the LPM. Thus, for the second group, the routing mapper 240 generates a mapped group with 5 replicated entries corresponding to indices 2-6 in the multipath table 320. Since group size for the first group is not changed, the first group of 2 entries in the multipath table 320 starts from index 0 as indicated in the LPM table 310.

FIG. 3 further illustrates that, when a packet with destination prefix 10.1.2.1 arrives at switch S2, the destination prefix may be matched with prefixes in the Longest Prefix Match (LPM) table 310. The LPM table 310 shows that the first group at switch S2 has prefix 10.1.1.0/24 starting with base index 0, and that the second group at switch S2 has prefix 10.1.2.0/24 starting with base index 2. According to the LPM table 310, it may be determined that the packet's destination prefix 10.1.2.1 has the longest match with prefix 10.1.2.0/24, thus an egress port of the second group at switch S2 is to be selected. That is, a selection is to be made from the mapped group of switch S2, which includes 5 entries with indices 2-6. As such, H1 may be applied to the hash fields of the packet, which for example may result in value 9. A modulo of 5 may then be applied to the value 9, resulting in a value 4. This value 4 may be added to the mapped group's base index 2, which then generates the index 6 corresponding to the egress port 1 of switch S2. The packet may then be forwarded using egress port 1, for example as shown in FIG. 1B egress port 1 may forward the packet to switch S4.

FIG. 3 thus illustrates resizing and mapping a group of egress ports for a switch S2, thereby changing the LPM 310 and multi-path table 320 for switch S2. Since resizing has been done to switch S2, resizing and mapping may not be required for switch S1, for example if there is no other hash correlation in addition to H1 and H2 as described above. The LPM 310 and multi-path table 320 for switch S1 may remain unchanged. Thus, hash results at switch S1 and switch S2 are de-correlated by making changes at switch S2.

Figure 7A:
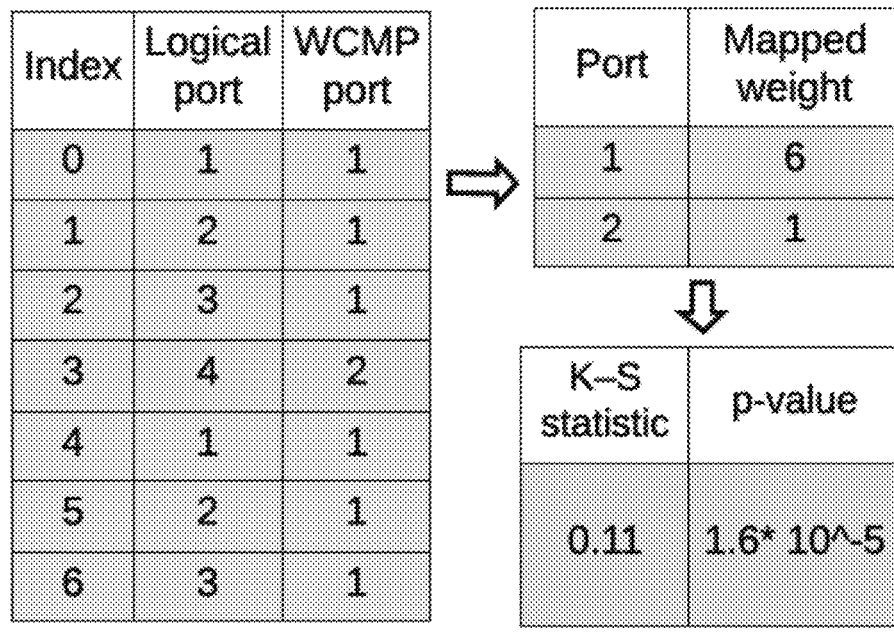
FIGS. 7A and 7B illustrate example route mapping for a WCMP network in accordance with aspects of the disclosure.
Figure 7B:
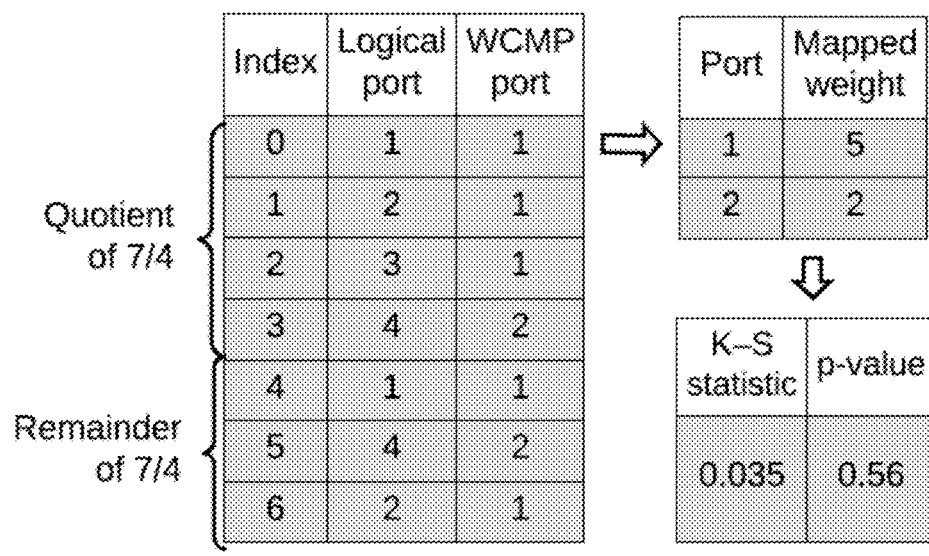

For a WCMP network, the routing mapper 240 may be further configured to map entries according to routing weights 220. For instance, FIGS. 7A and 7B illustrate example mapping for a WCMP group. FIGS. 7A and 7B both illustrate mapping for a WCMP group of two actual egress ports—egress port 1 with weight 3, and egress port 2 with weight 1—to a new group size of q=7.

In the example of FIG. 7A, mapping is performed on a WCMP group as if there are a number W of ECMP egress ports, where W is the sum of the weights of an WCMP group, and that the indices are mapped in a round robin manner until the intended new group size is met. Thus as shown, the group of egress ports are treated as if there are W=3+1=4 ports (3 of egress port 1 and 1 of egress port 2), being mapped to a group with 7 indices. The first $\lfloor 7\%4 \rfloor = 3$ entries are mapped $\lfloor 7/4 \rfloor + 1 = 2$ times, the remaining 1 entry is mapped $\lfloor 7/4 \rfloor = 1$ time. Egress port 1 is mapped 6 times, while the egress port 2 is mapped 1 time, thus the observed weight ratio of the newly mapped group is 6:1, which is twice of the originally desired ratio of 3:1. This is further indicated by the K-S statistic of 0.11 and p-value of $1.6*10^{-5}$.

FIG. 7B illustrates an alternative way to map a WCMP group to ensure that the observed weight ratio is close to the desired weight ratio. In this regard, the quotient and the remainder of q/W may be handled differently. For the quotient, each WCMP egress port in the WCMP group may be replicated by $w_i * \lfloor q/W \rfloor$ times, where $w_i$ is the weight for the respective egress port, while for the remainder r=q % W, the first r' WCMP ports are replicated one more time than others when r≠0, where r'=r % L. Thus each of the first r' WCMP ports are replicated for $w_i * \lfloor q/W \rfloor + \lfloor r/L \rfloor + 1$ times, while each of the remaining egress ports is replicated $w_i \lfloor q/W \rfloor + \lfloor y/L \rfloor$ times. Further, the WCMP ports may be sorted in a descending order by their weights to make sure that the ports with higher weights are replicated one more time for the remainder r. Thus in the example, each WCMP egress port 1 and 2 is replicated by $w_i * \lfloor 7/4 \rfloor$ times, thus egress port 1 is replicated 3*1 times, and egress port 2 is replicated 1*1 times. For the remainder of r=7%4=3 entries, the first r'=3%2=1 egress port is replicated one more time than others, thus egress port 1 is replicated two more times while egress port 1 is replicated one more time. Thus, the result is that the first r'=7%4%2=1 egress port is replicated $3*\lfloor 7/4 \rfloor + \lfloor 7\%4/2 \rfloor + 1 = 5$ times, resulting in 5 entries of egress port 1, while the remaining egress ports are replicated $1*\lfloor 7/4 \rfloor + \lfloor 3/2 \rfloor = 2$ times, resulting in 2 entries of egress port 2. The observed weight ratio of the newly mapped group is 5:2, which is closer to the originally desired weight ratio of 3:1 as compared to FIG. 7A. This is further indicated by a smaller K-S statistic of 0.035 and a greater p-value of 0.56, as compared to the example of FIG. 7A.

Figure 8:
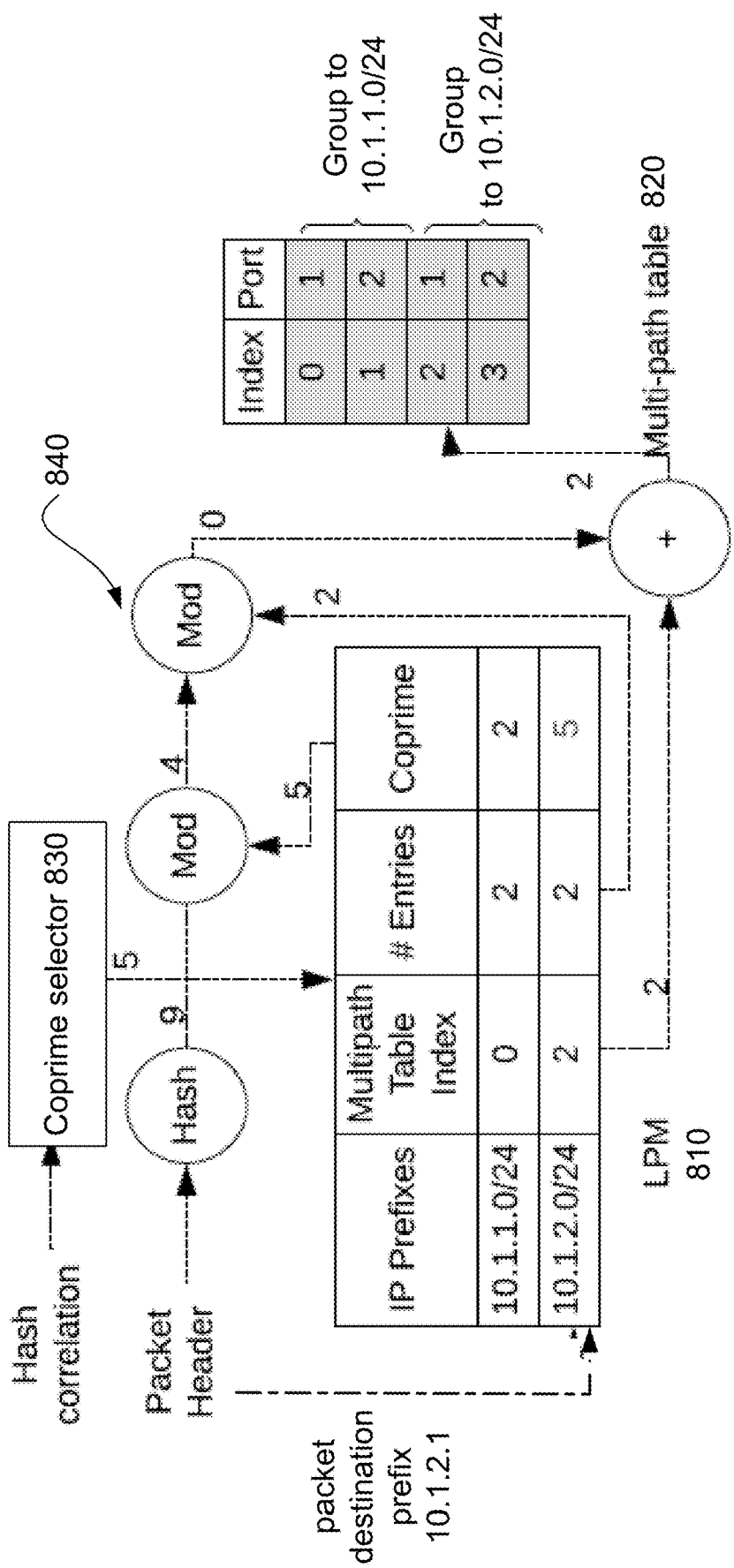
FIG. 8 is a pictorial diagram illustrating an example alternative process for mitigating hash correlation in accordance with aspects of the disclosure.

FIG. 8 is a block diagram illustrating another example process to mitigate hash correlation in a multipath network as an alternative to the process of FIG. 3. FIG. 8 illustrates this alternative process with reference to the example network 100 of FIG. 1B, and shows some similar features as FIG. 3, including an LPM 810, a multipath table 820, and a coprime selector 830. However, instead of having a routing mapper 240 as shown in FIG. 3, the alternative process of FIG. 8 changes the data pipeline by adding another modulus operation 840. For example as shown, when a packet with same header as the example of FIG. 3 arrives at switch S2 for forwarding, hash function H1 is applied to the headers resulting in value 9, and then a modulus operation of %2 is applied resulting in value 4. The additional modulus operation 840, which is %5, is then applied by switch S2, resulting in a value of 0. By adding this value of 0 to the group's base index of 2, the egress port with index 2 corresponding to actual egress port 2 on switch S2 is selected, which routes to switch S5. In this regard, since the alternative process illustrated by FIG. 8 does not use a routing mapper 240 in network controller 210, changes to the data plane 250 are required. For instance, the switches in the network may be configured to apply the additional modulus operation to packet headers. As such, to implement this alternative process, participation of vendors making the switch chips may be required.

FIG. 9 is a flow diagram 900 illustrating an example method in accordance with aspects of the disclosure. The method may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted. Although FIG. 9 illustrates one example method, variations of the methods may be performed, for instance as described above with reference to FIGS. 2-8. The flow diagram 900 may be performed by one or more processors, such as the one or more processors running the network controller 210. The one or more processors may receive data and make determinations based on the data as described above with reference to FIGS. 2-8.

Referring to FIG. 9, at block 910, it is determined that a hash correlation exists between a first switch in a network and a second switch in a network. An example of such a network is shown in FIG. 1B, where a first egress port is to be selected among a first group of egress ports at the first switch for forwarding packets, a second egress port is to be selected among a second group of egress ports at the second switch for forwarding packets, and the first group has a first group size and the second group has a second group size. Further as illustrated by the example of FIG. 1B, the hash correlation may be found by determining that a first hash function applied at the first switch and a second hash function applied at the second switch are the same, and that the second group is reachable by the first group. The hash correlation may be determined using a directed graph, as shown in FIG. 4.

At block 920, upon determining that the hash correlation exists, a new second group size coprime to the first group size may be selected. For an ECMP group, the new second group size may be selected based on a covariance of the ECMP group meeting a predetermined threshold. For a WCMP group, the new second group size may be selected based on a K-S statistic of the WCMP group meeting a predetermined threshold, such as shown in FIGS. 5A and 5B. In some instances, the new second group size may be further selected to meet a memory capacity for routing tables in the network. Further, it may be determined whether to assign the first group or the second group a new group size based on comparing the memory usage of the two groups.

At block 930, the second group of egress ports is mapped to a mapped group having the new second group size. For instance, the mapping may be performed by replicating one or more egress port in a multipath routing table into multiple entries, such as shown in FIG. 3. Further as shown in FIGS. 7A and 7B, routing weights may be taken into consideration when mapping according to the new group size for a WCMP group. In this regard, in cases where routing weights may be updated based on updated telemetry data, updates or re-mapping according to the updated routing weights may be performed.

At block 940, the second switch is configured to route packets according to the mapped group. For instance as illustrated by a comparison of the examples shown in FIG. 1B and FIG. 3, although the same hash function may still be applied at the first switch and the second switch, because selection of egress ports at the second switch is from the newly mapped group with the new group size, the result is that all egress ports of the mapped group has some chance of being selected. Thus, hash correlation is mitigated and load balancing may be achieved.

The technology is advantageous in a number of ways. For instance, by avoiding adding new hash functions to the switches, the system may mitigate hash correlation without requiring switch vendors to support new hash functions or creating computation bottlenecks. By avoiding manipulation of the existing hash functions, computations of CRCs are not needed, and randomization may be reserved for other network functions. Further, the technology can be adapted to mitigate hash correlation in both ECMP and WCMP networks, such as features that dynamically adapt the mapping of WCMP egress ports according to routing weight changes. Features of the technology also provide for reducing overall memory usage by the switches in the network and at the same time, increasing uniformity of traffic by using diversified error bounds for coprime group size selection at different switches.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
assigning, by one or more processors, a first multi-path routing function to a first switch along a forwarding path in a network, wherein the first multi-path routing function is configured to select a next hop from the first switch from among a first group of candidate next hops having a first group size; and
assigning, by one or more processors, a second multi-path routing function to a second switch along the forwarding path in a network, wherein the second multi-path routing function is configured to select a next hop from the second switch from among a second group of candidate next hops having a second group size, wherein the second multi-path routing function is configured to select the second group size to be coprime to the first group size.

2. The method of claim 1, wherein each of the first multi-path routing function and the second multi-path routing function is a hash function, and wherein the next hop of a given packet is derived by applying the hash function to one or more fields of a header of the given packet.

3. The method of claim 1, further comprising determining, by the one or more processors, a correlation between the first multi-path routing function and a previous multi-path routing function of the second switch, and wherein assigning the second multi-path routing function to the second switch is performed is in response to the determined correlation.

4. The method of claim 1, wherein the second group of candidate next hops is an ECMP group, and the second group size is assigned further based on a covariance of the ECMP group meeting a predetermined threshold.

5. The method of claim 1, wherein the second group of candidate next hops is a WCMP group, and the second group size is assigned further based on a K-S statistic of the WCMP group meeting a predetermined threshold.

6. The method of claim 1, wherein the second group size is assigned further based on meeting a memory capacity for routing tables in the network.

7. The method of claim 1, further comprising:
determining, by the one or more processors, that a first memory usage for the first group of candidate next hops is greater than a second memory usage for the second group of candidate next hops, wherein the second group size is assigned in response to the first memory usage being greater than the second memory usage.

8. The method of claim 1, further comprising:
determining, by the one or more processors, that a first memory usage for the first group by the first switch is less than a second memory usage for the second group by the second switch, wherein, the first group size is assigned in response to the first memory usage being less than the second memory usage.

9. The method of claim 1, wherein the second group is a WCMP group, the method further comprising mapping, by the one or more processors, the second group of candidate next hops based on routing weights assigned to the second group of candidate next hops.

10. The method of claim 9, further comprising:
receiving, by the one or more processors, telemetry data of the network;
updating, by the one or more processors, routing weights to the second group of candidate next hops based on the received telemetry data; and
re-mapping, by the one or more processors, the second group of candidate next hops based on the updated routing weights.

11. A system, comprising:
one or more processors; and
memory comprising program instructions that, when executed by the one or more processors, cause the one or more processors to:
- assign a first multi-path routing function to a first switch along a forwarding path in a network, wherein the first multi-path routing function is configured to select a next hop from the first switch from among a first group of candidate next hops having a first group size; and
- assign a second multi-path routing function to a second switch along the forwarding path in a network, wherein the second multi-path routing function is configured to select a next hop from the second switch from among a second group of candidate next hops having a second group size, wherein the second multi-path routing function is configured to select the second group size to be coprime to the first group size.

12. The system of claim 11, wherein each of the first multi-path routing function and the second multi-path routing function is a hash function, and wherein the next hop of a given packet is derived by applying the hash function to one or more fields of a header of the given packet.

13. The system of claim 11, wherein the program instructions further cause the one or more processors to:
- determine a correlation between the first multi-path routing function and a previous multi-path routing function of the second switch; and
- assign the second multi-path routing function to the second switch in response to the determined correlation.

14. The system of claim 11, wherein the second group of candidate next hops is an ECMP group, and the second group size is assigned further based on a covariance of the ECMP group meeting a predetermined threshold.

15. The system of claim 11, wherein the second group of candidate next hops is a WCMP group, and the second group size is assigned further based on a K-S statistic of the WCMP group meeting a predetermined threshold.

16. The system of claim 11, wherein the second group size is assigned further based on meeting a memory capacity for routing tables in the network.

17. The system of claim 11, wherein the program instructions further cause the one or more processors to determine that a first memory usage for the first group of candidate next hops is greater than a second memory usage for the second group of candidate next hops, wherein the second group size is assigned in response to the first memory usage being greater than the second memory usage.

18. The system of claim 11, wherein the program instructions further cause the one or more processors to determine that a first memory usage for the first group by the first switch is less than a second memory usage for the second group by the second switch, wherein the first group size is assigned in response to the first memory usage being less than the second memory usage.

19. The system of claim 11, wherein the second group is a WCMP group, and the program instructions further cause the one or more processors to map the second group candidate next hops based on routing weights assigned to the second group of candidate next hops.

20. The system of claim 19, wherein the program instructions further cause the one or more processors to:
- receive telemetry data of the network;
- update routing weights to the second group of candidate next hops based on the received telemetry data; and
- re-map the second group of candidate next hops based on the updated routing weights.

* * * * *